United States Patent
Wei et al.

(10) Patent No.: US 10,214,382 B2
(45) Date of Patent: Feb. 26, 2019

(54) DISK DAMPING DEVICE

(71) Applicant: Otis Elevator Company, Farmington, CT (US)

(72) Inventors: Wei Wei, Farmington, CT (US); James L. Hubbard, Kensington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/403,835

(22) Filed: Jan. 11, 2017

(65) Prior Publication Data
US 2018/0194593 A1    Jul. 12, 2018

(51) Int. Cl.
| B66B 1/32 | (2006.01) |
| B66B 1/36 | (2006.01) |
| F16F 15/02 | (2006.01) |
| F16F 15/00 | (2006.01) |
| B66D 5/14 | (2006.01) |
| B66D 5/30 | (2006.01) |
| F16D 59/02 | (2006.01) |
| F16D 65/00 | (2006.01) |

(52) U.S. Cl.
CPC .................. *B66B 1/36* (2013.01); *B66B 1/32* (2013.01); *B66D 5/14* (2013.01); *B66D 5/30* (2013.01); *F16D 59/02* (2013.01); *F16D 65/0006* (2013.01); *F16F 15/002* (2013.01); *F16F 15/02* (2013.01)

(58) Field of Classification Search
CPC .... B66B 1/32; B66B 1/36; B66B 5/16; B66B 1/24; F02M 57/005
See application file for complete search history.

(56) References Cited

U.S. PATENT DOCUMENTS

| 915,936 | A |   | 3/1909  | Cheney |
| 4,796,728 | A |   | 1/1989 | Kanengieter et al. |
| RE36,034 | E |   | 1/1999 | Sheridan |
| 6,155,390 | A |   | 12/2000 | Ozechowski |
| 7,699,145 | B2 |  | 4/2010 | Ericson |
| 8,151,950 | B2 |  | 4/2012 | Fargo |
| 8,323,074 | B2 | * | 12/2012 | Maeda ...................... B23B 5/02 451/262 |
| 2009/0032340 | A1 | * | 2/2009 | Smith ..................... B66B 7/042 187/250 |

(Continued)

FOREIGN PATENT DOCUMENTS

| EP | 0957281 A2 | 11/1999 |
| JP | H11171440 A | 6/1999 |
| KR | 20040003822 A | 1/2004 |

OTHER PUBLICATIONS

Anonymous, "Damping and noise-reducing device for elevator brake manufacturing method Technology X", Retrived at URL: <http://www.technology-x.net/CN02/201320618223.html>, 4 pages.

(Continued)

*Primary Examiner* — Marlon Fletcher
(74) *Attorney, Agent, or Firm* — Cantor Colburn LLP

(57) ABSTRACT

An elevator brake disk assembly is provided. The elevator brake disk assembly includes a brake disk which is keyed to and rotatable with a shaft of an elevator machine, a machine frame and dampers. The dampers are respectively anchored to the machine frame and biased to symmetrically hold the brake disk during rotations thereof.

16 Claims, 5 Drawing Sheets

(56) References Cited

U.S. PATENT DOCUMENTS

| | | | | |
|---|---|---|---|---|
| 2010/0252379 A1* | 10/2010 | Piech | ............ | B66D 5/14 |
| | | | | 188/161 |
| 2012/0031715 A1 | 2/2012 | Conway | | |
| 2012/0175201 A1* | 7/2012 | Lahteenmaki | ............ | B66D 5/30 |
| | | | | 188/171 |
| 2013/0206514 A1* | 8/2013 | Kim | ............ | B66B 9/025 |
| | | | | 187/240 |
| 2014/0048359 A1 | 2/2014 | Olkkonen et al. | | |
| 2014/0299425 A1* | 10/2014 | Schautt | ............ | B66B 5/18 |
| | | | | 188/158 |

OTHER PUBLICATIONS

Search Report dated Jun. 11, 2018 in EP application No. 18150941. 5, 11 pages.

\* cited by examiner

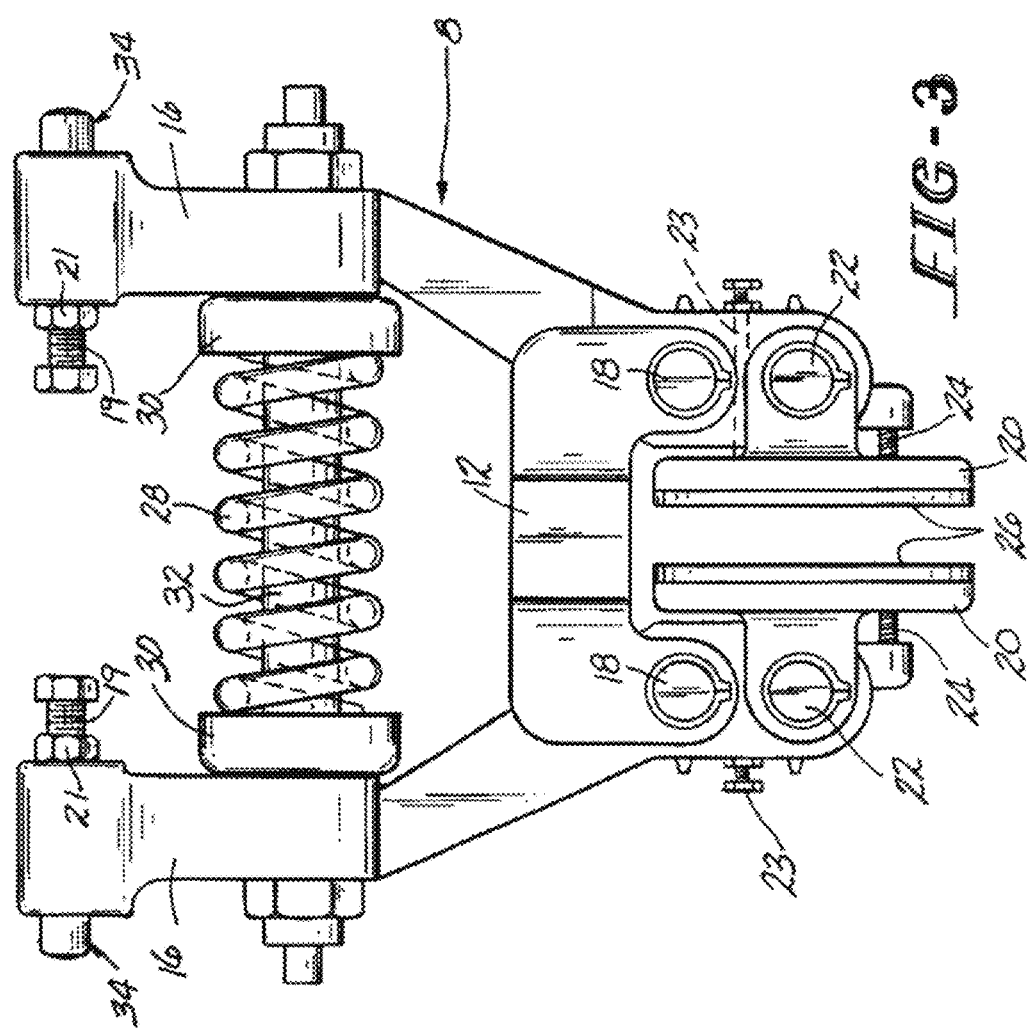

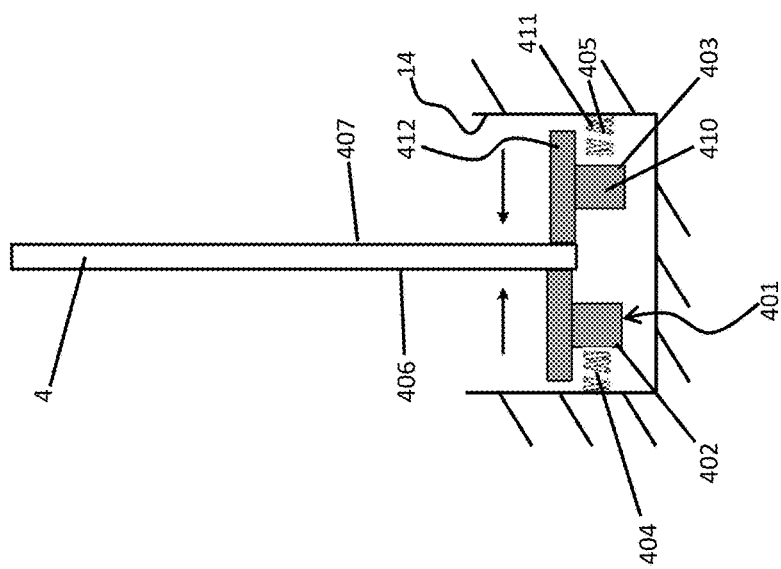
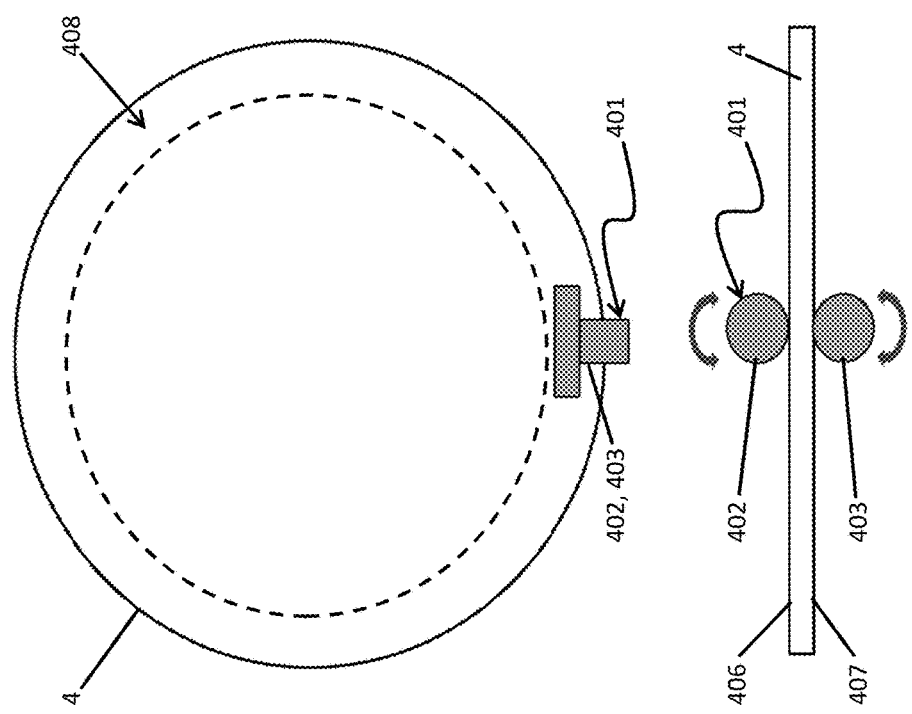

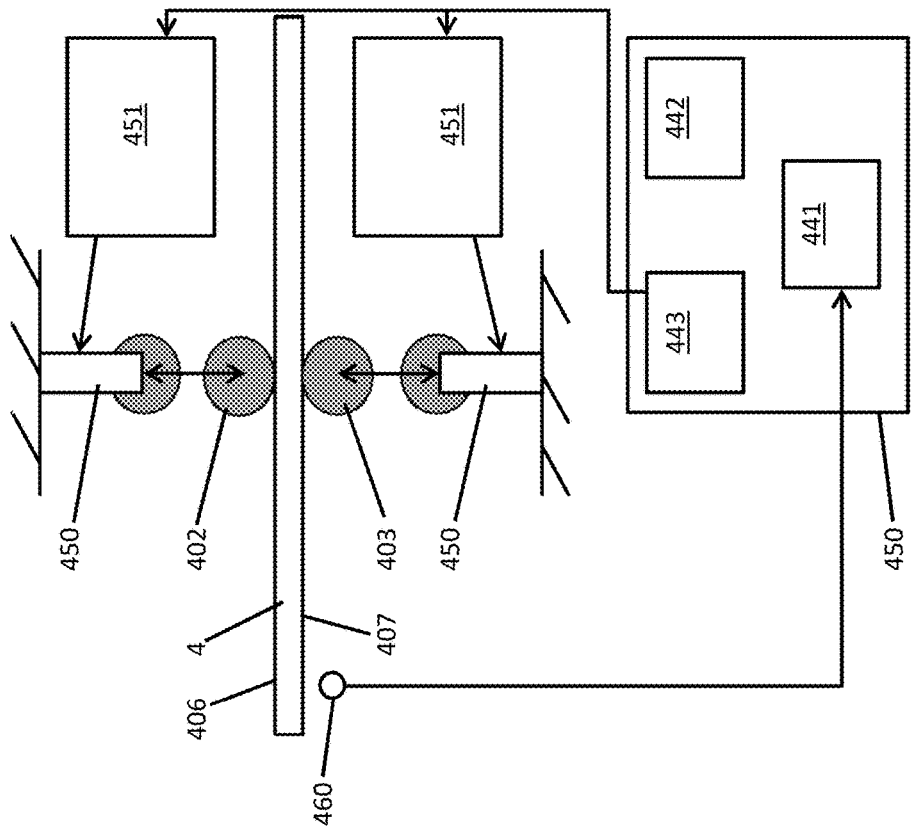
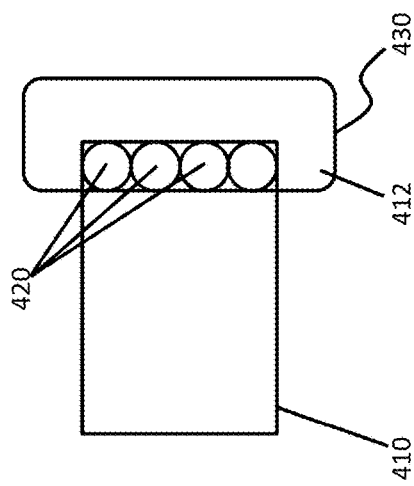

DISK DAMPING DEVICE

BACKGROUND

The following description relates to elevators and, more particularly, to elevators equipped with a high speed machine disk damping device.

A disk brake is often used to act upon a disk secured to an elevator machine shaft in order to hold an elevator car in place at a landing. Such disk brakes are typically provided as full plate disk brakes with brake shoes being operable to engage the periphery of the disk.

In certain applications, the use of disk brakes can be noisy. The noise can reach up to about 90 decibels and can be generated by excitation of the disk brakes by electrical frequencies of the elevator machine motor at certain operational frequencies during acceleration and deceleration. Redesigning the elevator machine motor to avoid causing the disk brake excitation can be difficult and costly, however, so other methods of reducing or eliminating the noise need to be undertaken.

BRIEF DESCRIPTION

According to one aspect of the disclosure, an elevator brake disk assembly is provided. The elevator brake disk assembly includes a brake disk which is keyed to and rotatable with a shaft of an elevator machine, a machine frame and dampers. The dampers are respectively anchored to the machine frame and biased to symmetrically hold the brake disk during rotations thereof.

In accordance with additional or alternative embodiments, the dampers include first and second opposed dampers.

In accordance with additional or alternative embodiments, the dampers symmetrically hold a periphery of the brake disk.

In accordance with additional or alternative embodiments, the dampers generate negligible friction with the brake disk.

In accordance with additional or alternative embodiments, each of the dampers includes a base, an elastic member coupled at a first end thereof to the base and at a second end thereof to the machine frame and a roller which is rotatable with the brake disk relative to and coupled with the base.

In accordance with additional or alternative embodiments, each of the dampers further includes a roller bearing to couple the roller and the base.

In accordance with additional or alternative embodiments, the roller has a curved surface for contacting a complementary surface of the brake disk.

In accordance with another aspect of the disclosure, an elevator brake disk assembly is provided. The elevator brake disk assembly includes a brake disk which is keyed to and rotatable with a shaft of an elevator machine, a machine frame, dampers and a controller. The dampers are respectively anchored to the machine frame and controllable to assume and move between respective first positions at which the dampers are disengaged from the brake disk and respective second positions at which the dampers are biased to symmetrically hold the brake disk during rotations thereof. The controller is configured to identify a condition of the brake disk being in effect and to selectively cause the dampers to move between the first and second positions accordingly.

In accordance with additional or alternative embodiments, the dampers include first and second opposed dampers.

In accordance with additional or alternative embodiments, the dampers symmetrically hold a periphery of the brake disk.

In accordance with additional or alternative embodiments, the dampers generate negligible friction with the brake disk.

In accordance with additional or alternative embodiments, each of the dampers includes a base, an elastic member coupled at a first end thereof to the base and at a second end thereof to the machine frame and a roller which is rotatable with the brake disk relative to and coupled with the base.

In accordance with additional or alternative embodiments, each of the dampers further includes a roller bearing to couple the roller and the base.

In accordance with additional or alternative embodiments, the roller has a curved surface for contacting a complementary surface of the brake disk.

In accordance with additional or alternative embodiments, the each of the dampers further includes an actuator configured to move the roller toward or away from the brake disk.

In accordance with additional or alternative embodiments, each of the dampers further includes an actuator configured to move the roller toward or away from the brake disk and a servo element which is controllable by the controller to actuate the actuator.

In accordance with additional or alternative embodiments, the controller includes a brake disk noise sensor.

In accordance with yet another aspect of the disclosure, a method of operating an elevator brake disk assembly is provided. The method includes operating an elevator machine to rotate a brake disk, sensing a parameter of the brake disk during rotations thereof, identifying whether a condition of the brake disk is in effect from results of the sensing and selectively causing dampers which are respectively controllable to assume and move between respective first and second positions to move between the first and second positions in accordance with the identifying of whether the condition is in effect. At the respective first positions, the dampers are disengaged from the brake disk, and, at the respective second positions, the dampers are biased to symmetrically hold the brake disk during rotations thereof.

In accordance with additional or alternative embodiments, the sensing of the parameter includes sensing noise generated by the brake disk during the rotations thereof.

In accordance with additional or alternative embodiments, the identifying of whether the condition is in effect comprises determining that the noise generated by the brake disk during the rotations thereof exceeds a predefined level.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 3 is a top plan view of one of the brake modules of FIG. 1;

FIG. 4 is a top down view of a brake disk and dampers in accordance with embodiments;

FIG. 5 is a side view of the brake disk and the dampers of FIG. 4;

FIG. 6 is an in-plane view of the brake disk and the dampers of FIG. 4;

FIG. 7 is a schematic illustration of a roller bearing of the dampers of FIG. 4 in accordance with embodiments; and FIG. 8 is a schematic illustration of a controller and servo control elements for operation with the dampers of FIG. 4 in accordance with further embodiments.

DETAILED DESCRIPTION

As will be described below, spinning damping devices or rollers are provided to symmetrically hold a brake disk during running or operation of the elevator machine motor. The damping devices are pre-loaded toward the brake disk by a spring or an elastic element so that they prevent brake disk excitation or otherwise significantly reduce brake disk excitation. Such brake disk excitation reductions lead, in turn, to corresponding reductions in noise. In addition, since the damping devices are provided as rollers, there is negligible friction between the brake disk and the damping devices and thus little to no noise (at least as compared to noise generated by the elevator machine motor) is produced by the engagement of the damping devices with the brake disk.

Figure 1:
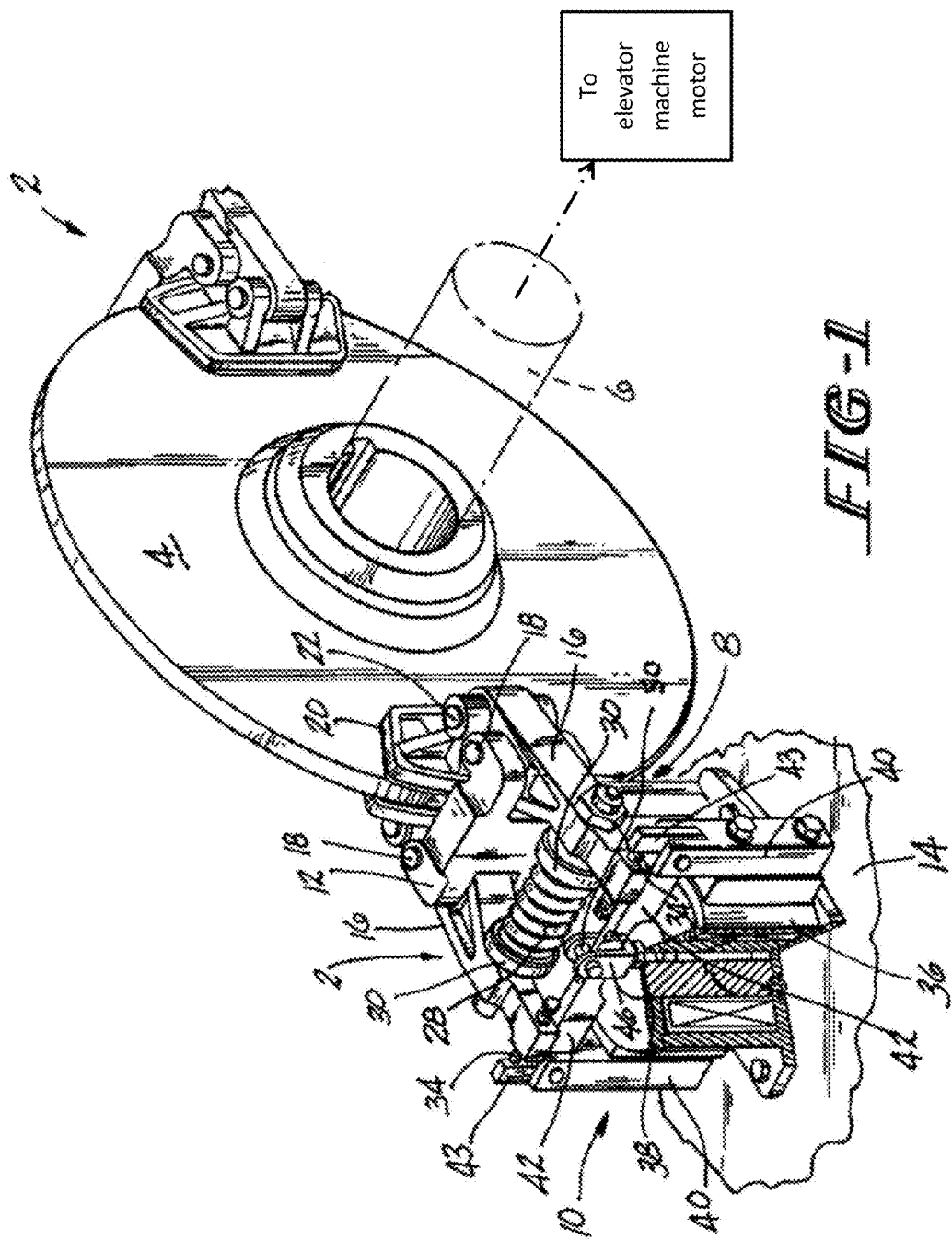
FIG. 1 is a perspective view of brake modules and an associated disk which is keyed to an elevator machine shaft in accordance with embodiments.
Figure 2:
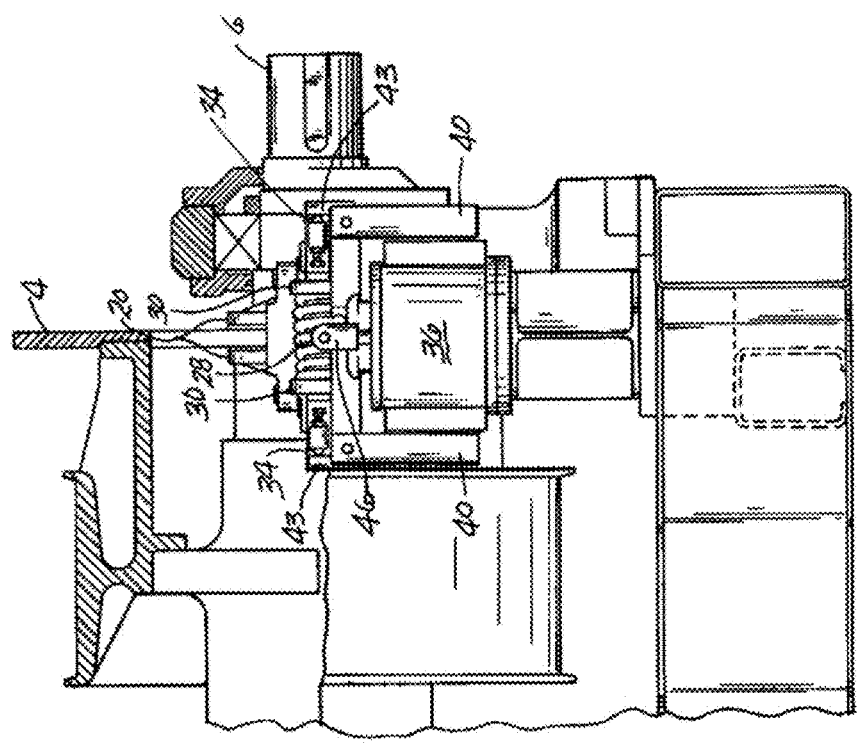
FIG. 2 is an elevational view partially in section showing the disk of FIG. 1 mounted on a sheave.

With reference to FIGS. 1-3, brake modules 2 are shown and provided for operable interaction with a brake disk 4. The brake disk 4 is keyed to and rotatable with shaft 6 and the shaft 6 is provided as an extension of an elevator machine motor. Each of the brake modules 2 includes a brake assembly 8 and a brake latch assembly 10.

The brake assembly 8 includes a bracket 12 which is fixed to machine frame 14 and to which two opposed brake arms 16 are mounted for pivotal movement about vertical pins 22. The pins 18 pass through lugs 17 on the brake shoes 20 and the lugs 17 are disposed above and below the brake arms 16. A brake shoe 20 is pivotally mounted on pins 22 to the brake arms 16 so as to flank the brake disk 4. A coil spring 24 is sandwiched between each brake shoe 20 and its respective brake arm 16 biases each brake shoe 20 about its respective pin 22 and against the inner end of an adjustable screw 23. The adjustable screw 23 is threaded into each brake arm 16 such that the brake pads 26 on the brake shoes 20 remain parallel to each other and to the brake disk 4. A brake actuating spring 28 is mounted in spring caps 30 that are carried on spring guides 32 secured to the brake arms 16. The brake actuating spring 28 biases the brake arms 16 outwardly about the pins 18 thereby biasing the brake shoes 20 against the brake disk 4. This action will occur whenever power is removed from the solenoid 36 so that in the event of a power failure or an emergency the brake pads 26 automatically sit on the brake disk 4. The brake actuating spring 28 supplies the force needed to set the brake pads 26. Cam pins 34 are mounted on the ends of the brake arms 16 at a location remote from the brake shoes 20.

The brake latch assembly 10 includes a solenoid 36 with an energized coil which is fixed to the machine frame 14 and a solenoid actuated plunger 38 that moves up and down in the solenoid 36. Brackets 40 are mounted on opposite sides of the solenoid 36 and latch levers 42 with upturned fingers 43 are pivotally mounted on the brackets 40 via pins 44. A clevis 46 is disposed on the plunger 38 and receives overlapping ends 48 of the levers 42. A pin 50 spans the clevis 46 and overlies the ends 48 of the levers 42 thereby interconnecting the solenoid plunger 38 and the levers 42. The upturned fingers 43 on the levers 42 engage the cam pins 34 on the brake assembly 8.

It is to be understood that the brake modules 2 of FIGS. 1-3, which are described above, can have various configurations and constructions and that the embodiments provided herein are merely examples of the same. Thus, it is to be understood that the brake modules 2 can have many different or other configurations and methods of operation. In any case, the following additional description will relate to the embodiments described herein but would be applicable to any brake modules in which a brake disk is employed.

With reference to FIGS. 4-7, an elevator brake disk assembly 401 is provided for reducing noise generated by excitation of the brake disk 4 during running or operation of the elevator machine motor. The elevator brake disk assembly includes the brake disk 4, which is keyed to and rotatable with the shaft 6 (see FIG. 1) of the elevator machine as described above, the machine frame 14 (see FIG. 1) and first and second dampers 402 and 403. The first damper 402 and the second damper 403 oppose one another and are respectively anchored to the machine frame 14 by first elastic element 404 and second elastic element 405. The first damper 402 and the second damper 403 are thus biased by the first elastic element 404 and the second elastic element 405, respectively, to symmetrically hold opposite sides 406 and 407 of a periphery 408 of the brake disk 4 during rotations thereof.

Because the first damper 402 and the second damper 403 roll with the rotations of the brake disk 4, engagement of the first damper 402 and the second damper 403 with the brake disk 4 generates negligible friction between the first damper 402 and the side 406 and between the second damper 403 and the side 407. As such, the engagement of the first damper 402 and the second damper 403 with the brake disk 4 produces little to no noise at least as compared to surrounding noise producing components.

As shown in FIG. 5, each of the first damper 402 and the second damper 403 includes a base part 410, an elastic member 411 and a roller element 412. The elastic member 411 is coupled at a first end thereof to the base part 410 and at a second end thereof to the machine frame 14 to thus anchor the base part 410 to the machine frame 14 with a bias toward the brake disk 4. The roller element 412 is coupled with the base part 410 and is rotatable with the brake disk 4 relative to the base part 410. To this end, as shown in FIG. 7, each of the first damper 402 and the second damper 403 may further include a roller bearing 420 by which the roller element 412 and the base part 410 are coupled. The roller bearing 420 may be provided, for example, as a ball bearing as permits nearly frictionless rotation of the roller element 412 relative to the base part 410.

In accordance with embodiments, the brake disk 4 may be formed of cast iron or other metallic materials. The roller element 412, on the other hand, may be formed of metallic or polymeric materials. In any case, the roller element 412 may have a circumferentially curved and axially curved surface 430.

In accordance with further embodiments and, with reference to FIG. 8, the first damper 402 and the second damper 403 may be controllable to assume and move between respective first positions and respective second positions. At the respective first positions, the first damper 402 and the second damper 403 are disengaged from the brake disk 4. At the respective second positions, the first damper 402 and the second damper 403 are engaged with the opposite sides 406 and 407 of the brake disk 4 and biased to symmetrically hold the brake disk 4 during the rotations thereof. In such cases, the elevator brake disk assembly 401 may further include a controller 440.

The controller 440 includes a processing element 441, a memory unit 442 and a servo control unit 443. The memory unit 442 has executable instructions stored thereon, which, when executed, cause the processing element 441 to identify whether a condition of the brake disk 4 is or is not in effect and, if the condition is in effect, to issue an instruction to the servo control unit 443 to selectively cause the first damper 402 and the second damper 403 to move from the first positions to the second positions (or to permit the first damper 402 and the second damper 403 to remain in the first positions or to move from the second positions to the first positions if the condition is not in effect).

The movements of the first damper 402 and the second damper 403 may be driven, for example, by actuators 450 that are actuated by servo elements 451. The actuators 450 may be provided as linear actuators, rotary actuators or any other type of actuators and may be operated by electro-mechanical or hydraulic actuation. The servo elements 451 are provided in signal communication with the servo control unit 443 of the controller 440 so that the servo elements 451 are controllable by the controller 440 to actuator the actuators 450.

In addition, the elevator brake disk assembly 401 may include a brake disk noise sensor 460. In such cases, the brake disk noise sensor 460 may be disposed proximate to the brake disk 4 such that noise produced by an excitation of the brake disk 4 is picked up by the brake disk noise sensor 460. The brake disk noise sensor 460 is coupled to the controller 440 such that data reflective of noise being picked up by the brake disk noise sensor 460 can be transmitted to the controller 440. Thus, the controller 440 is capable of receiving the data and determining on the basis of an analysis of that data whether a given, predefined condition of the brake disk 4 is in effect. That is, the controller 440 is able to determine whether a certain level of noise is being produced and, if so, to have the actuators 450 actuated so as to bring the first damper 402 and the second damper 403 into engagement with the brake disk 4.

In accordance with embodiments, the controller 440 may be tuned so that any noise picked up by the brake disk node sensor 460 is sufficient to bring the first damper 402 and the second damper 403 into engagement with the brake disk 4. Alternatively, the controller 440 may be tuned to only do so when the noise level is at or above a predefined threshold. This predefined threshold may be modified manually or automatically over time.

Thus, a method of operating the elevator brake disk assembly 401 is provided and includes operating an elevator machine to rotate the brake disk 4, sensing a parameter of the brake disk 4 during the rotations thereof (here, the parameter may be the noise produced as a result of brake disk 4 excitation), identifying whether a condition of the brake disk 4 is in effect from results of the sensing and selectively causing the first damper 402 and the second damper 403 to move between the respective first and second positions in accordance with the identifying of whether the condition is in effect.

With the configuration described above, noise caused by the disk brake in an elevator machine can be reduced from about 90 decibels to about 70-80 decibels and, in some cases, to about 76 decibels without any substantial re-design of the elevator machine motor.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An elevator brake disk assembly, comprising:
    a brake disk which is keyed to and rotatable with a shaft of an elevator machine;
    a machine frame; and
    dampers which are respectively anchored to the machine frame and biased to symmetrically hold the brake disk during rotations thereof,
    wherein each of the dampers comprises:
        a base;
        an elastic member coupled at a first end thereof to a first side of the base and at a second end thereof, which is opposite the first end, to the machine frame;
        a roller which is coupled to a second side of the base adjacent to the first side and which is rotatable with the brake disk relative to the base; and
        a roller bearing by which the roller and the second side of the base are coupled.

2. The elevator brake disk assembly according to claim 1, wherein the dampers comprise first and second opposed dampers.

3. The elevator brake disk assembly according to claim 1, wherein the dampers symmetrically hold a periphery of the brake disk.

4. The elevator brake disk assembly according to claim 1, wherein the dampers generate negligible friction with the brake disk.

5. The elevator brake disk assembly according to claim 1, wherein the roller has a curved surface for contacting a complementary surface of the brake disk.

6. An elevator brake disk assembly, comprising:
    a brake disk which is keyed to and rotatable with a shaft of an elevator machine;
    a machine frame;
    dampers which are respectively anchored to the machine frame and controllable to assume and move between respective first positions at which the dampers are disengaged from the brake disk and respective second positions at which the dampers are biased to symmetrically hold the brake disk during rotations thereof; and
    a controller comprising a brake disk noise sensor which is configured to identify a condition of the brake disk being in effect and to selectively cause the dampers to move between the first and second positions accordingly.

7. The elevator brake disk assembly according to claim 6, wherein the dampers comprise first and second opposed dampers.

8. The elevator brake disk assembly according to claim 6, wherein the dampers symmetrically hold a periphery of the brake disk.

9. The elevator brake disk assembly according to claim 6, wherein the dampers generate negligible friction with the brake disk.

10. The elevator brake disk assembly according to claim 6, wherein each of the dampers comprises:
a base;
an elastic member coupled at a first end thereof to the base and at a second end thereof to the machine frame; and
a roller which is rotatable with the brake disk relative to and coupled with the base.

11. The elevator brake disk assembly according to claim 10, wherein each of the dampers further comprises a roller bearing to couple the roller and the base.

12. The elevator brake disk assembly according to claim 10, wherein the roller has a curved surface for contacting a complementary surface of the brake disk.

13. The elevator brake disk assembly according to claim 10, wherein each of the dampers further comprises an actuator configured to move the roller toward or away from the brake disk.

14. The elevator brake disk assembly according to claim 10, wherein each of the dampers further comprises an actuator configured to move the roller toward or away from the brake disk and a servo element which is controllable by the controller to actuate the actuator.

15. A method of operating an elevator brake disk assembly, the method comprising:
operating an elevator machine to rotate a brake disk;
sensing a parameter of the brake disk during rotations thereof;
identifying whether a condition of the brake disk is in effect from results of the sensing; and
selectively causing dampers which are respectively controllable to assume and move between respective first and second positions to move between the first and second positions in accordance with the identifying of whether the condition is in effect,
wherein, at the respective first positions, the dampers are disengaged from the brake disk, and, at the respective second positions, the dampers are biased to symmetrically hold the brake disk during rotations thereof,
wherein the sensing of the parameter comprises sensing noise generated by the brake disk during the rotations thereof.

16. The method according to claim 15, wherein the identifying of whether the condition is in effect comprises determining that the noise generated by the brake disk during the rotations thereof exceeds a predefined level.

* * * * *